United States Patent
Du et al.

(10) Patent No.: US 11,206,216 B2
(45) Date of Patent: Dec. 21, 2021

(54) FLEXIBLE ETHERNET FRAME FORWARDING METHOD AND APPARATUS

(71) Applicant: Huawei Technologies Co., Ltd., Shenzhen (CN)

(72) Inventors: Wenhua Du, Dongguan (CN); Yongzhi Liu, Shenzhen (CN); Tao Lin, Shenzhen (CN); Jun Hu, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 62 days.

(21) Appl. No.: 16/851,615

(22) Filed: Apr. 17, 2020

(65) Prior Publication Data
US 2020/0244579 A1 Jul. 30, 2020

Related U.S. Application Data

(63) Continuation of application No. PCT/CN2018/102016, filed on Aug. 23, 2018.

(30) Foreign Application Priority Data

Oct. 18, 2017 (CN) .......................... 201710970615.0

(51) Int. Cl.
*H04L 12/741* (2013.01)
*H04L 12/46* (2006.01)
(Continued)

(52) U.S. Cl.
CPC ........ *H04L 45/745* (2013.01); *H04L 12/4641* (2013.01); *H04L 45/66* (2013.01); *H04L 49/354* (2013.01)

(58) Field of Classification Search
CPC ... H04L 45/745; H04L 45/66; H04L 12/4641; H04L 49/354
(Continued)

(56) References Cited

U.S. PATENT DOCUMENTS 9,690,609 B2  6/2017 Lawler
2003/0189932 A1* 10/2003 Ishikawa ................. H04L 47/10
370/392
(Continued)

FOREIGN PATENT DOCUMENTS

CN  100442772 C  12/2008
CN  104618083 A   5/2015
(Continued)

OTHER PUBLICATIONS

Li, R., et al., "X-Ethernet: Enabling integrated fronthaul/backhaul architecture in 5G networks," 2017 IEEE Conference on Standards for Communications and Networking (CSCN), IEEE, XP033241329, Sep. 18, 2017, pp. 121-125.
(Continued)

*Primary Examiner* — Candal Elpenord
(74) *Attorney, Agent, or Firm* — Conley Rose, P.C.

(57) ABSTRACT

A flexible Ethernet (FlexE) frame forwarding method, including receiving a first frame through a FlexE client input channel, obtaining a first channel identifier used to indicate the FlexE client input channel and a first subchannel identifier carried in the first frame, where the first subchannel identifier is used to indicate a logical subchannel of the FlexE client input channel, searching a preset forwarding table based on the first channel identifier and the first subchannel identifier to obtain a second channel identifier and a second subchannel identifier, where the second channel identifier is used to indicate a FlexE client output channel, and the second subchannel identifier is used to indicate a logical subchannel of the FlexE client output channel, and forwarding the first frame based on the second channel identifier and the second subchannel identifier.

20 Claims, 6 Drawing Sheets

(51) Int. Cl.
  *H04L 12/931* (2013.01)
  *H04L 12/721* (2013.01)
(58) Field of Classification Search
  USPC .......................................................... 370/392
  See application file for complete search history.

(56) References Cited

U.S. PATENT DOCUMENTS

| | | | |
|---|---|---|---|
| 2005/0083952 A1* | 4/2005 | Swain ................. | H04L 12/4625 370/401 |
| 2007/0097968 A1 | 5/2007 | Du | |
| 2008/0225853 A1* | 9/2008 | Melman .............. | H04L 12/4625 370/392 |
| 2015/0055664 A1* | 2/2015 | Kanonakis ............. | H04Q 11/00 370/535 |
| 2016/0119076 A1 | 4/2016 | Gareau | |
| 2016/0197743 A1 | 7/2016 | Su et al. | |
| 2017/0005742 A1 | 1/2017 | Gareau et al. | |
| 2017/0289045 A1* | 10/2017 | Renner ................... | H04L 49/25 |
| 2018/0013511 A1* | 1/2018 | Hussain .............. | H04J 14/0205 |
| 2018/0102834 A1* | 4/2018 | Ibach ...................... | H04B 10/03 |
| 2019/0173856 A1* | 6/2019 | Gareau ................. | H04L 1/0061 |

FOREIGN PATENT DOCUMENTS

| | | |
|---|---|---|
| CN | 106612220 A | 5/2017 |
| WO | 2017070851 A1 | 5/2017 |

OTHER PUBLICATIONS

IA #OIF-FLEXE-01.1, "Flex Ethernet Implementation Agreement," Jun. 21, 2017, 35 pages.

IEEE Std 802.3-2015, "IEEE Standard for Ethernet, IEEE Computer Society," Sep. 3, 2015, 4017 pages.

* cited by examiner

| 10 | 0X4B | Data (Data) | Data (Data) | Data (Data) | 0x6 | 0x00 | 0x00 | 0x00 | 0x0 |

FIG. 6

FLEXIBLE ETHERNET FRAME FORWARDING METHOD AND APPARATUS

CROSS-REFERENCE TO RELATED APPLICATIONS

This application is a continuation of International Patent Application No. PCT/CN2018/102016, filed on Aug. 23, 2018, which claims priority to Chinese Patent Application No. 201710970615.0, filed on Oct. 18, 2017, both of which are hereby incorporated by reference in their entireties.

TECHNICAL FIELD

This application relates to the field of communications technologies, and in particular, to a flexible Ethernet (FlexE) frame forwarding method and apparatus.

BACKGROUND

The FlexE protocol published by the Optical Internetworking Forum (OIF) is a general technology that supports a plurality of Ethernet media access control (MAC) layer rates.

In a FlexE protocol-based forwarding process, a FlexE device receives a to-be-forwarded frame using a FlexE client configured to receive the frame, then determines, by searching a forwarding table, a FlexE client configured to send the frame, and forwards the frame through the FlexE client configured to send the frame. In the foregoing solution, for a frame, a rate of a FlexE client configured to send the frame and a rate of a FlexE client configured to receive the frame need to match (be the same) to implement the foregoing frame forwarding process. Therefore, the foregoing frame forwarding manner can implement only one-to-one forwarding between two clients with a same rate. This is oversimplified and inflexible, and inapplicable to forwarding between clients with different rates.

It can be learned that in other approaches, a forwarding manner in a FlexE-based frame forwarding process is undiversified and inflexible.

SUMMARY

This application provides a FlexE frame forwarding method and apparatus, to provide a more flexible FlexE frame forwarding solution.

According to a first aspect, an embodiment of this application provides a FlexE frame forwarding method. The method includes receiving a first frame through a FlexE client input channel, obtaining a first channel identifier used to indicate the FlexE client input channel and a first subchannel identifier carried in the first frame, where the first subchannel identifier is used to indicate a logical subchannel of the FlexE client input channel, searching a preset forwarding table based on the first channel identifier and the first subchannel identifier to obtain a second channel identifier and a second subchannel identifier, where the second channel identifier is used to indicate a FlexE client output channel, and the second subchannel identifier is used to indicate a logical subchannel of the FlexE client output channel, and forwarding the first frame based on the second channel identifier and the second subchannel identifier.

In the foregoing solution, because the first frame carries the first subchannel identifier used to indicate the logical subchannel of the FlexE client input channel, after the first frame is received, the first channel identifier used to indicate the FlexE client input channel and the first subchannel identifier carried in the first frame may be obtained. Then the forwarding table may be searched to determine the second channel identifier and the second subchannel identifier that are used to forward the first frame, and the first frame is forwarded based on the second channel identifier and the second subchannel identifier. According to the foregoing solution, because the first frame may be considered to be received through a logical subchannel of the FlexE client input channel, when being forwarded, the first frame may also be considered to be forwarded through a logical subchannel of the FlexE client output channel. Accordingly, a FlexE client channel with a fixed transmission rate may be divided into a plurality of logical subchannels. In this way, in a process of forwarding the first frame, when being selected, the FlexE client input channel and the FlexE client output channel are not necessarily limited to an inherent transmission rate of the FlexE client channel. Compared with a manner in other approaches that can implement only one-to-one forwarding between two FlexE clients with a same rate, the foregoing solution can achieve a more flexible frame forwarding process.

In a possible design, the FlexE client input channel is divided into N logical subchannels, and N≥1.

In the foregoing implementation, specially, the FlexE client input channel includes only one logical subchannel, that is, N=1. In other words, a quantity of logical subchannels obtained by dividing the FlexE client input channel is not limited in this embodiment of this application.

In a possible design, the forwarding the first frame based on the second channel identifier and the second subchannel identifier includes adding the second subchannel identifier to the first frame, or replacing the first subchannel identifier carried in the first frame with the second subchannel identifier, and forwarding, through the FlexE client output channel indicated by the second channel identifier, the first frame that carries the second subchannel identifier.

According to the foregoing solution, before the first frame is forwarded through the FlexE client output channel indicated by the second channel identifier, the second subchannel identifier may be added to the first frame, or the first subchannel identifier carried in the first frame is replaced with the second subchannel identifier such that the first frame carries the second subchannel identifier used to indicate the logical subchannel that is in the FlexE client output channel and that is configured to forward the first frame.

In a possible design, the obtaining a first subchannel identifier carried in the first frame includes, if the first frame carries the first subchannel identifier, obtaining the first subchannel identifier carried in the first frame, or if the first frame does not carry the first subchannel identifier, adding a preset default subchannel identifier to the first frame, and using the default subchannel identifier as the first subchannel identifier carried in the first frame.

According to the foregoing solution, when the FlexE client input channel includes a plurality of logical subchannels, the first frame carries the first subchannel identifier. In this case, the first subchannel identifier carried in the first frame may be directly obtained. When the FlexE client input channel includes only one logical subchannel, the default subchannel identifier may be used as the first subchannel identifier carried in the first frame.

In a possible design, the searching a preset forwarding table based on the first channel identifier and the first subchannel identifier to obtain a second channel identifier and a second subchannel identifier includes searching the preset forwarding table based on the first channel identifier and the first subchannel identifier to obtain a multicast identification (MID) corresponding to the first channel identifier and the first subchannel identifier, and searching a preset multicast table based on the MID to obtain a plurality of second channel identifiers corresponding to the MID and a plurality of second subchannel identifiers that one-to-one correspond to the plurality of second channel identifiers, and the forwarding the first frame based on the second channel identifier and the second subchannel identifier includes replicating the first frame to obtain first frames whose quantity is the same as that of the plurality of second channel identifiers, and respectively forwarding, based on the plurality of second channel identifiers and the plurality of second subchannel identifiers that one-to-one correspond to the plurality of second channel identifiers, the first frames whose quantity is the same as that of the plurality of second channel identifiers.

According to the foregoing solution, the FlexE frame forwarding method may be applied to a multicast forwarding scenario, to forward the first frame to a plurality of devices.

In a possible design, the searching a preset forwarding table based on the first channel identifier and the first subchannel identifier to obtain a second channel identifier and a second subchannel identifier includes generating a first tag index based on the first channel identifier and the first subchannel identifier, searching the forwarding table based on the first tag index to obtain a second tag index corresponding to the first tag index, and generating the second channel identifier and the second subchannel identifier based on the second tag index.

According to the foregoing solution, an index entry of the forwarding table may be the first tag index, and a result entry may be the second tag index. The forwarding table in this form can simplify a field of the forwarding table, and reduce system overheads caused by establishing and maintaining the forwarding table.

In a possible design, the first frame is a first data frame, the first data frame includes an S block part, a D block part, and a T block part, and the S block part carries the first subchannel identifier.

According to the foregoing solution, an implementation in which the first frame carries the first subchannel identifier is provided.

In a possible design, the first frame is a second data frame, the second data frame includes a destination MAC (DMAC) address, a source MAC (SMAC) address, a virtual local area network tag (VLAN tag), and a data field, and the VLAN tag carries the first subchannel identifier.

According to the foregoing solution, an implementation in which the first frame carries the first subchannel identifier is provided.

In a possible design, the first frame is an operation, administration, and maintenance (OAM) frame, the OAM frame includes at least one 64b/66b code block, and the at least one 64b/66b code block carries the first subchannel identifier.

According to the foregoing solution, an implementation in which the first frame carries the first subchannel identifier is provided.

In a possible design, the FlexE client input channel is a standard Ethernet port, or the FlexE client output channel is a standard Ethernet port.

According to the foregoing solution, the FlexE frame forwarding method may be applied to different network devices in a transport network that use different interface standards.

According to a second aspect, this application provides a FlexE frame forwarding apparatus. The apparatus has a function of implementing the foregoing method example in the first aspect. The function may be implemented by hardware, or may be implemented by hardware executing corresponding software. The hardware or the software includes one or more modules corresponding to the function.

In a possible design, a structure of the backup apparatus includes an input interface, a switch unit, and an output interface. These units may perform corresponding functions in the foregoing method example. Refer to the detailed descriptions in the foregoing method example for details, which are not described herein.

According to a third aspect, an embodiment of this application further provides a FlexE frame forwarding apparatus. The apparatus includes a memory, a processor, and a communications module. The memory is configured to store a computer-readable program. The processor is configured to invoke an instruction stored in the memory, to perform a corresponding function in the foregoing method example. The communications module is configured to perform a function of receiving data and/or sending data in the foregoing method example.

According to a fourth aspect, an embodiment of this application provides a computer-readable storage medium. The computer-readable storage medium stores a computer instruction. When the instruction is run on a computer, the computer is enabled to perform the method in the first aspect and any possible design of the first aspect.

According to a fifth aspect, an embodiment of this application provides a computer program product. When the computer program product is invoked by a computer, the computer is enabled to perform the method in the first aspect and any possible design of the first aspect.

BRIEF DESCRIPTION OF DRAWINGS

FIG. 6 is a schematic diagram of a frame structure of an OAM frame according to an embodiment of this application.

DESCRIPTION OF EMBODIMENTS

To make the objectives, technical solutions, and advantages of the embodiments of the present disclosure clearer, the following further describes the embodiments of the present disclosure in detail with reference to the accompanying drawings.

It should be noted that "a plurality of" in this application means "at least two". In addition, it should be understood that in the descriptions of this application, terms such as "first" and "second" are merely used for differentiation and description, but should not be understood as indicating or implying relative importance, or should not be understood as indicating or implying a sequence.

An application scenario of the embodiments of this application is first briefly described.

Figure 1:
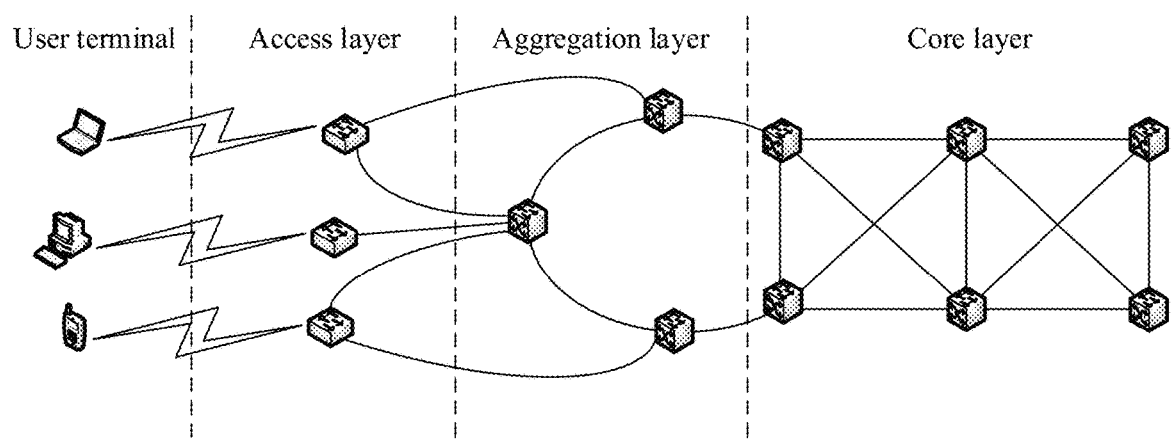
FIG. 1 is a schematic structural diagram of a transport network according to an embodiment of this application.

A FlexE frame forwarding solution provided in the embodiments of this application may be applied to a transport network shown in FIG. 1. The transport network shown in FIG. 1 may be divided into an access layer, an aggregation layer, and a core layer.

The core layer is a high-speed switching backbone of the network and plays a critical role in connectivity of the entire network. A main purpose of the core layer is to provide an optimized and reliable backbone transmission structure through high-speed forwarding communication. Therefore, a network device at the core layer has comparatively high reliability and a comparatively large throughput. Generally, the core layer uses a network device with comparatively high bandwidth.

The aggregation layer, located between the access layer and the core layer, is responsible for processing all traffic from the access layer and providing a link between the access layer and the core layer.

The access layer is a part for a user to directly connect to or access the network, and a purpose of the access layer is to allow a user terminal to connect to the network.

The transport network shown in FIG. 1 includes a plurality of network devices. The network devices herein may be understood as interface devices that support the FlexE protocol. Frames are forwarded between the network devices based on the FlexE protocol. Data exchange between a user terminal and a backbone network or data exchange between user terminals may be implemented through forwarding operations between the plurality of network devices.

In the network devices included in the transport network shown in FIG. 1, a network device located at the core layer may be a core (provider) device (P device). The P device has a powerful switching capability and may be configured for high-speed switching of a data stream. A network device located at the aggregation layer may be a provider edge (PE) device. The PE device may be configured to connect the access layer and the core layer, and is a most important network node. A data stream flows to the access layer using the PE device, or flows to the core layer using the PE device. A network device located at the access layer may be a customer edge (CE) device. The CE device is configured to provide an access service for a user terminal.

In addition, in the transport network shown in FIG. 1, interfaces between the network devices may be classified into two types a network-to-network interface (NNI) and a user-network interface (UNI). The NNI may be an interface between a PE device and a P device, or may be an interface between two P devices. The UNI interface may be an interface between a user terminal and a CE device.

As described above, data exchange between a user terminal and a backbone network or data exchange between user terminals may be implemented through forwarding operations between the plurality of network devices. To be specific, in the transport network shown in FIG. 1, each network device is configured to forward a frame. A data stream of the user terminal may be forwarded through the CE device→the PE device→the P device to the backbone network, and a data stream of the backbone network may be forwarded through the P device→the PE device→the CE device to the user terminal.

Each network device in FIG. 1 may receive a frame through an internal input interface. The frame is transmitted to an output interface of the network device by a switch unit, and then forwarded through the output interface. For a network device that forwards a frame based on the FlexE protocol, an input interface may be considered to include a plurality of FlexE client input channels, and the frame may be considered to be input to the device through one of the FlexE client input channels. Similarly, an output interface may be considered to include a plurality of FlexE client output channels, and the frame may be considered to be forwarded to another device through one of the FlexE client output channels.

Specifically, an existing FlexE frame forwarding process may be as follows.

Figure 2:
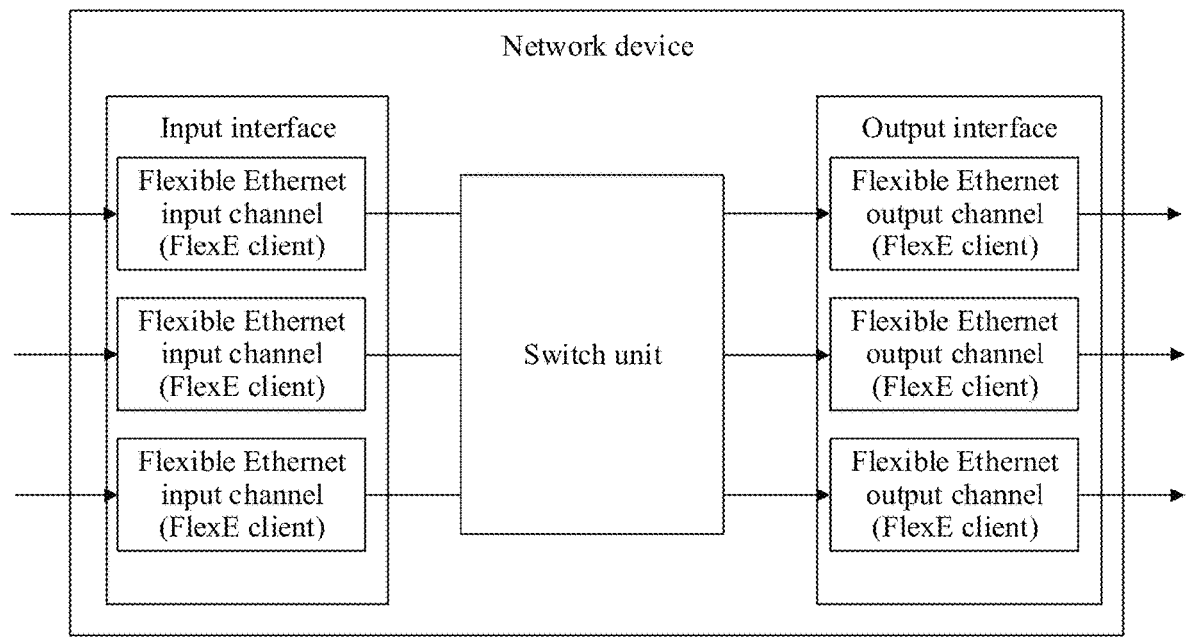
FIG. 2 is a schematic diagram of a frame forwarding solution according to an embodiment of this application.

In the transport network shown in FIG. 1, a frame forwarding process of a network device may be implemented through switching between FlexE client channels. To be specific, each network device may receive a frame through a FlexE client input channel, and may forward the frame through a FlexE client output channel after switching processing. The foregoing frame forwarding process may be shown in FIG. 2. In FIG. 2, an input interface includes a plurality of FlexE client channels, and an output interface also includes a plurality of FlexE client channels. The network device may receive a frame through a FlexE client channel of the input interface, then determine, by searching a forwarding table using a switch unit, a FlexE client channel that is in the output interface and that is configured to forward the frame, and finally forward the frame through the FlexE client channel that is configured to forward the frame. In the foregoing frame forwarding solution, switching performed between FlexE client channels are all based on a 64b/66b code block.

In the frame forwarding solution shown in FIG. 2, for a frame, rates of a FlexE client channel that is in the input interface and that is configured to receive the frame and a FlexE client channel that is in the output interface and that is configured to forward the frame need to match (be the same). For example, if the rate of the FlexE client channel that is in the input interface and that is configured to receive the frame is 5 gigabits per second (Gb/s), the rate of the FlexE client channel that is in the output interface and that is configured to forward the frame also needs to be 5 Gb/s. If the rate of the FlexE client channel that is in the input interface and that is configured to receive the frame is 20 Gb/s, the rate of the FlexE client channel that is in the output interface and that is configured to forward the frame also needs to be 20 Gb/s.

It should be noted that, for a FlexE client channel, when a frame is forwarded using the frame forwarding solution shown in FIG. 2, a granularity of a rate of the FlexE client channel is 5 Gb/s. In other words, the rate of the FlexE client channel needs to be an integer multiple of 5 Gb/s, for example, may be 5 Gb/s, 10 Gb/s, 15 Gb/s, 20 Gb/s, or 25 Gb/s.

It can be learned from analysis of the foregoing FlexE frame forwarding solution that, the FlexE frame forwarding solution provided in other approaches has the following problems.

1. Only one-to-one forwarding between two FlexE client channels can be implemented. For each FlexE client input channel of the input interface, a frame received through the FlexE client input channel can be forwarded through only one FlexE client output channel. Similarly, for a FlexE client output channel in the output interface, a frame forwarded by the FlexE client output channel is from only one FlexE client input channel.

2. Rates of two FlexE client channels between which a frame is switched need to be the same. To be specific, for a frame, rates of a FlexE client channel that is in the input interface and that is configured to receive the frame and a FlexE client channel that is in the output interface and that is configured to forward the frame need to match (be the same). For example, if the rate of the FlexE client channel that is in the input interface and that is configured to receive the frame is 5 Gb/s, the rate of the FlexE client channel that is in the output interface and that is configured to forward the frame also needs to be 5 Gb/s.

3. Data streams of a plurality of low-speed FlexE client channels cannot be switched to one high-speed FlexE client channel. For example, a transmission rate of a FlexE client 1 is 5 Gb/s, a transmission rate of a FlexE client 2 is 10 Gb/s, and a transmission rate of a FlexE client 3 is 100 Gb/s. According to the existing FlexE frame forwarding solution, frames received through the FlexE client 1 and the FlexE client 2 used as two input channels cannot be switched to the FlexE client 3 used as an output channel.

4. A data stream of a high-speed FlexE client channel cannot be split to be switched to a plurality of low-speed FlexE client channels. For example, a transmission rate of a FlexE client 1 is 5 Gb/s, a transmission rate of a FlexE client 2 is 10 Gb/s, and a transmission rate of a FlexE client 3 is 100 Gb/s. According to the existing FlexE frame forwarding solution, a frame received through the FlexE client channel 3 used as an input channel cannot be split to be respectively switched to the FlexE client 1 and the FlexE client 2 used as two output channels.

5. Because the granularity of the rate of the FlexE client channel is 5 Gb/s, resources are wasted when a low-speed data stream is transmitted. For example, if a data stream at a rate of 1 Gb/s is forwarded through a FlexE client input channel with a transmission rate of 10 Gb/s and a FlexE client output channel with a transmission rate of 10 Gb/s, resources of the FlexE client input channel and the FlexE client output channel are wasted.

In view of this, the embodiments of this application provide a FlexE frame forwarding method and apparatus, to resolve the foregoing problems of the existing FlexE forwarding solution, and provide a more flexible FlexE frame forwarding solution.

To achieve the foregoing objective, in the embodiments of this application, a FlexE client input channel is divided into a plurality of logical subchannels, and a FlexE client output channel is divided into a plurality of logical subchannels, to implement a more flexible FlexE frame forwarding solution.

For example, a FlexE client A with a transmission rate of 150 Gb/s may be divided into four logical subchannels, and transmission rates of the four logical subchannels may be 50 Gb/s, 70 Gb/s, 25 Gb/s, and 5 Gb/s respectively. A FlexE client B with a transmission rate of 100 Gb/s may be divided into three logical subchannels, and transmission rates of the three logical subchannels may be 25 Gb/s, 25 Gb/s, and 50 Gb/s respectively. A FlexE client C with a transmission rate of 50 Gb/s may be divided into two logical subchannels, and transmission rates of the two logical subchannels may be 25 Gb/s and 25 Gb/s respectively.

It should be noted that, in the foregoing example, the FlexE client A, the FlexE client B, and the FlexE client C may be FlexE client input channels, or may be FlexE client output channels. In addition, specially, the FlexE client channel may be one logical subchannel. In addition, in the foregoing example, a rate of each logical subchannel is a multiple of 5 Gb/s. However, in actual implementation, a rate of a logical subchannel obtained by dividing a FlexE client channel is not necessarily a multiple of 5 Gb/s, for example, may be 1 Gb/s, 2 Gb/s, or 10 Mbps. The rate of the logical subchannel is not specifically limited in the embodiments of this application.

The following specifically describes a FlexE frame forwarding solution of this application with reference to the accompanying drawings.

Figure 3:
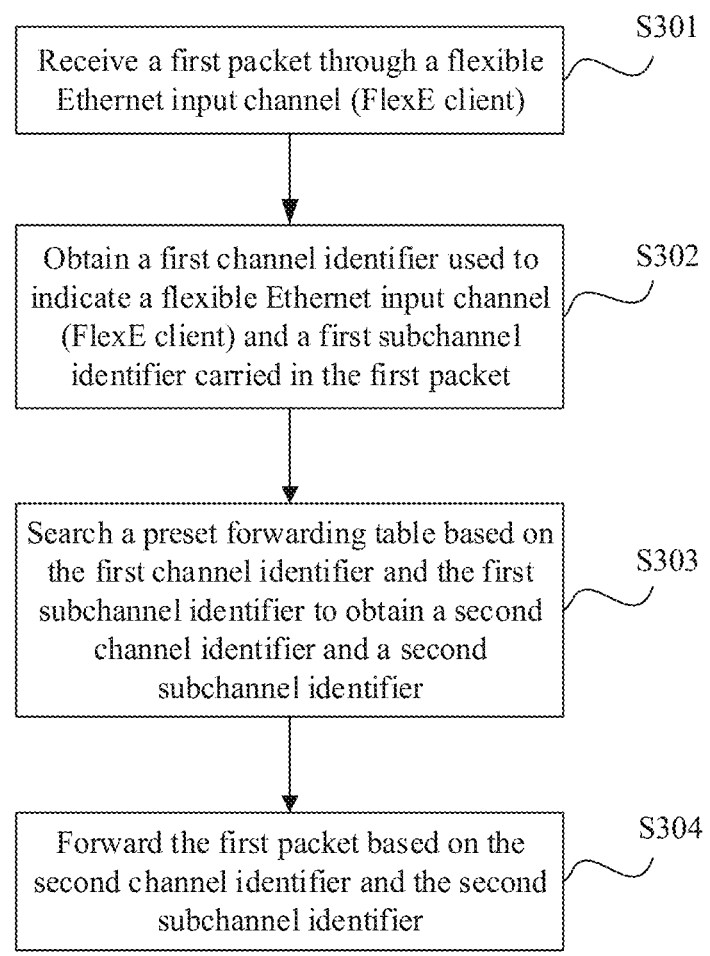
FIG. 3 is a schematic flowchart of a FlexE frame forwarding method according to an embodiment of this application.

FIG. 3 is a schematic flowchart of a FlexE frame forwarding method according to this application.

S301. Receive a first frame through a FlexE client input channel.

The first frame that is input through the FlexE client input channel carries a first subchannel identifier, and the first subchannel identifier is used to indicate a logical subchannel of the FlexE client input channel.

It should be noted that a difference between the first frame in this embodiment of this application and a frame that is forwarded through a FlexE transport network in other approaches lies in that the first frame in this embodiment of this application carries the first subchannel identifier. In other words, in this embodiment of this application, a format of the transmitted frame needs to be redefined as follows. Before the first frame is forwarded, a field used to identify the first subchannel identifier is added to the first frame. In addition, each network device in the transport network is configured to a network device capable of identifying the first subchannel identifier. When the first frame is forwarded to the network device, the network device may identify the first subchannel identifier carried in the first frame, and perform subsequent operations (S302 to S304) based on the identified first subchannel identifier, to complete forwarding of the first frame.

As described above, the FlexE client input channel may be divided into N logical subchannels, and N≥1. For the first frame, the receiving a first frame through a FlexE client input channel may be understood as receiving the first frame through one of the N logical subchannels of the FlexE client input channel, where the one of the N logical subchannels is indicated by the first subchannel identifier.

In this embodiment of this application, the FlexE client input channel is logically divided into the N logical subchannels, as the name implies. It may be considered that such division is to decompose a transmission rate of the FlexE client input channel. For example, a FlexE client input channel A with a transmission rate of 100 Gb/s is divided into three logical subchannels with transmission rates of 25 Gb/s, 35 Gb/s, and 40 Gb/s respectively a logical subchannel B, a logical subchannel C, and a logical subchannel D. Then, when the first frame is received through the FlexE client input channel A, it may be considered that the first frame is received through the logical subchannel B. In this case, a transmission rate of the first frame may be 25 Gb/s. Alternatively, it may be considered that the first frame is received through the logical subchannel C. In this case, a transmission rate of the first frame may be 35 Gb/s. Alternatively, it may be considered that the first frame is received through the logical subchannel D. In this case, a transmission rate of the first frame may be 40 Gb/s.

It should be noted that, in this embodiment of this application, when the first frame is received through a logical subchannel, the transmission rate of the first frame may be the same as a rate of the logical subchannel, or the transmission rate of the first frame may be less than a rate of the logical subchannel. For example, in the foregoing example, when the first frame is received through the logical subchannel B, the transmission rate of the first frame may be 25 Gb/s or may be less than 25 Gb/s. When the first frame is received through the logical subchannel C, the transmission rate of the first frame may be 35 Gb/s or may be less than 35 Gb/s. When the first frame is received through the logical subchannel D, the transmission rate of the first frame may be 40 Gb/s or may be less than 40 Gb/s. Similarly, when the first frame is forwarded through a logical subchannel, the transmission rate of the first frame may be the same as a rate of the logical subchannel, or the transmission rate of the first frame may be less than a rate of the logical subchannel. In other words, when a transmission rate of a logical subchannel is X, the logical subchannel may be configured to transmit a first frame at a transmission rate less than X.

In addition, understandably, a smaller difference between the rate of the logical subchannel and the rate of the first frame transmitted through the logical subchannel means that fewer resources are wasted. For example, in the foregoing example, if the transmission rate of the first frame is 20 Gb/s, fewer resources are wasted when the first frame is received through the logical subchannel B.

S302. Obtain a first channel identifier used to indicate the FlexE client input channel and the first subchannel identifier carried in the first frame.

When the first subchannel identifier is carried in the first frame, the first subchannel identifier carried in the first frame may be directly obtained. However, in S302, when the first subchannel identifier is obtained, specially, the FlexE client input channel includes only one logical subchannel, that is, N=1. In this case, a default subchannel identifier may be used as the first subchannel identifier that is carried in the first frame and that is obtained in S302.

For example, if the first channel identifier used to indicate the FlexE client input channel is 1, the FlexE client input channel includes four logical subchannels, and first subchannel identifiers used to indicate the four logical subchannels are 0, 1, 2, and 3 respectively, and the first frame carries the first subchannel identifier 2, the first subchannel identifier obtained in S302 is 2. If the first channel identifier used to indicate the FlexE client input channel is 2, the FlexE client input channel includes only one logical subchannel, in this case, the first frame may not carry the first subchannel identifier, and a default subchannel identifier is 0, the first subchannel identifier carried in the first frame and obtained in S302 may be the default subchannel identifier 0.

S303. Search a preset forwarding table based on the first channel identifier and the first subchannel identifier to obtain a second channel identifier and a second subchannel identifier.

The second channel identifier is used to indicate a FlexE client output channel, and the second subchannel identifier is used to indicate a logical subchannel of the FlexE client output channel.

The preset forwarding table may include four fields the FlexE client input channel, the first subchannel identifier, the FlexE client output channel, and the second subchannel identifier. Two fields, namely, the FlexE client input channel and the first subchannel identifier are an index entry, and two fields, namely, the FlexE client output channel and the second subchannel identifier are a result entry obtained based on the index entry. In another manner, an index entry of the preset forwarding table may be represented as {the first channel identifier, the first subchannel identifier}, and a result entry of the preset forwarding table may be represented as {the second channel identifier, the second subchannel identifier}, and {the second channel identifier, the second subchannel identifier} may be obtained by searching the forwarding table based on {the first channel identifier, the first subchannel identifier} obtained in S302.

It should be noted that the forwarding table in this embodiment of this application may be prestored on a network device that performs the method shown in FIG. 3. For example, the network device may preconfigure and store the forwarding table based on a transmission rate of a frame that needs to be forwarded in the transport network and a transmission rate of a FlexE client channel included by the network device. After receiving the first frame, the network device may obtain the first channel identifier and the first subchannel identifier based on the first frame, search the preconfigured forwarding table, and then forward the first frame based on the second channel identifier and the second subchannel identifier that are obtained by searching the forwarding table. In addition, the index entry and the result entry of the preset forwarding table may alternatively be represented in different manners. For example, the index entry of the forwarding table is a first tag index, and the result entry is a second tag index. For the forwarding table in this form, the searching a preset forwarding table based on the first channel identifier and the first subchannel identifier to obtain a second channel identifier and a second subchannel identifier in S303 needs to be implemented in the following manner generating the first tag index based on the first channel identifier and the first subchannel identifier, searching the forwarding table based on the first tag index to obtain the second tag index corresponding to the first tag index, and generating the second channel identifier and the second subchannel identifier based on the second tag index.

This implementation can simplify a field of the forwarding table, and reduce system overheads caused by establishing and maintaining the forwarding table.

It should be noted that a manner of representing the forwarding table is not limited in this embodiment of this application, provided that the second channel identifier and the second subchannel identifier can be obtained based on the first channel identifier and the first subchannel identifier by searching the forwarding table.

In S303, the second channel identifier is used to indicate the FlexE client output channel, and the second subchannel identifier is used to indicate the logical subchannel of the FlexE client output channel. As described above, the FlexE client output channel may be divided into M logical subchannels, and M≥1. Herein, the FlexE client output channel is logically divided into the M logical subchannels, as the name implies. It may be considered that such division is to decompose a transmission rate of the FlexE client output channel. For example, a FlexE client output channel E with a transmission rate of 100 Gb/s is divided into three logical subchannels with transmission rates of 20 Gb/s, 30 Gb/s, and 50 Gb/s respectively a logical subchannel F, a logical subchannel G, and a logical subchannel H. Then, when the first frame is forwarded through the FlexE client output channel E, it may be considered that the first frame is forwarded through the logical subchannel F. In this case, a transmission rate of the first frame may be less than or equal to 20 Gb/s. When the first frame is forwarded through the FlexE client output channel E, it may be considered that the first frame is forwarded through the logical subchannel G. In this case, a transmission rate of the first frame may be less than or equal to 30 Gb/s. When the first frame is forwarded through the FlexE client output channel E, it may be considered that the first frame is forwarded through the logical subchannel H. In this case, a transmission rate of the first frame may be less than or equal to 50 Gb/s.

It should be noted that in this embodiment of this application, transmission rates of the logical subchannel indicated by the first subchannel identifier and the logical subchannel indicated by the second subchannel identifier are the same. It may be considered that the first frame is received through the logical subchannel indicated by the first subchannel identifier and forwarded through the logical subchannel indicated by the second subchannel identifier. Therefore, the transmission rates of the logical subchannel indicated by the first subchannel identifier and the logical subchannel indicated by the second subchannel identifier need to match, to implement the FlexE frame forwarding method shown in FIG. 3.

In addition, the first subchannel identifier and the second subchannel identifier are merely examples of names, and any identifier or index that can be used to indicate a logical subchannel in a FlexE client channel may replace the subchannel identifier in this embodiment of this application, for example, the first subchannel identifier and the second subchannel identifier may be a subchannel identifier (subchannel ID), a logical interface index, or a logical link identifier (LLID).

It should also be noted that, in this embodiment of this application, a network device (for example, a P device or a PE device) configured to perform the FlexE frame forwarding method shown in FIG. 3 generally includes a plurality of FlexE client channels. For a FlexE client channel, assuming that the FlexE client channel is used as the FlexE client input channel when the first frame is forwarded, when another frame is forwarded, the FlexE client channel may be used as either a FlexE client input channel or a FlexE client output channel. This is not limited in this embodiment of this application.

It can be learned from the foregoing description that, the network device (for example, the P device or the PE device) configured to perform the FlexE frame forwarding method shown in FIG. 3 generally includes a plurality of FlexE client input channels and a plurality of FlexE client output channels, and each FlexE client input channel and each FlexE client output channel are divided into a plurality of logical subchannels. By performing S302, the logical subchannel in the FlexE client input channel through which the first frame is received may be determined. Then by performing S303, the logical subchannel in the FlexE client output channel through which the first frame needs to be forwarded may be determined by searching the preset forwarding table.

Figure 4:
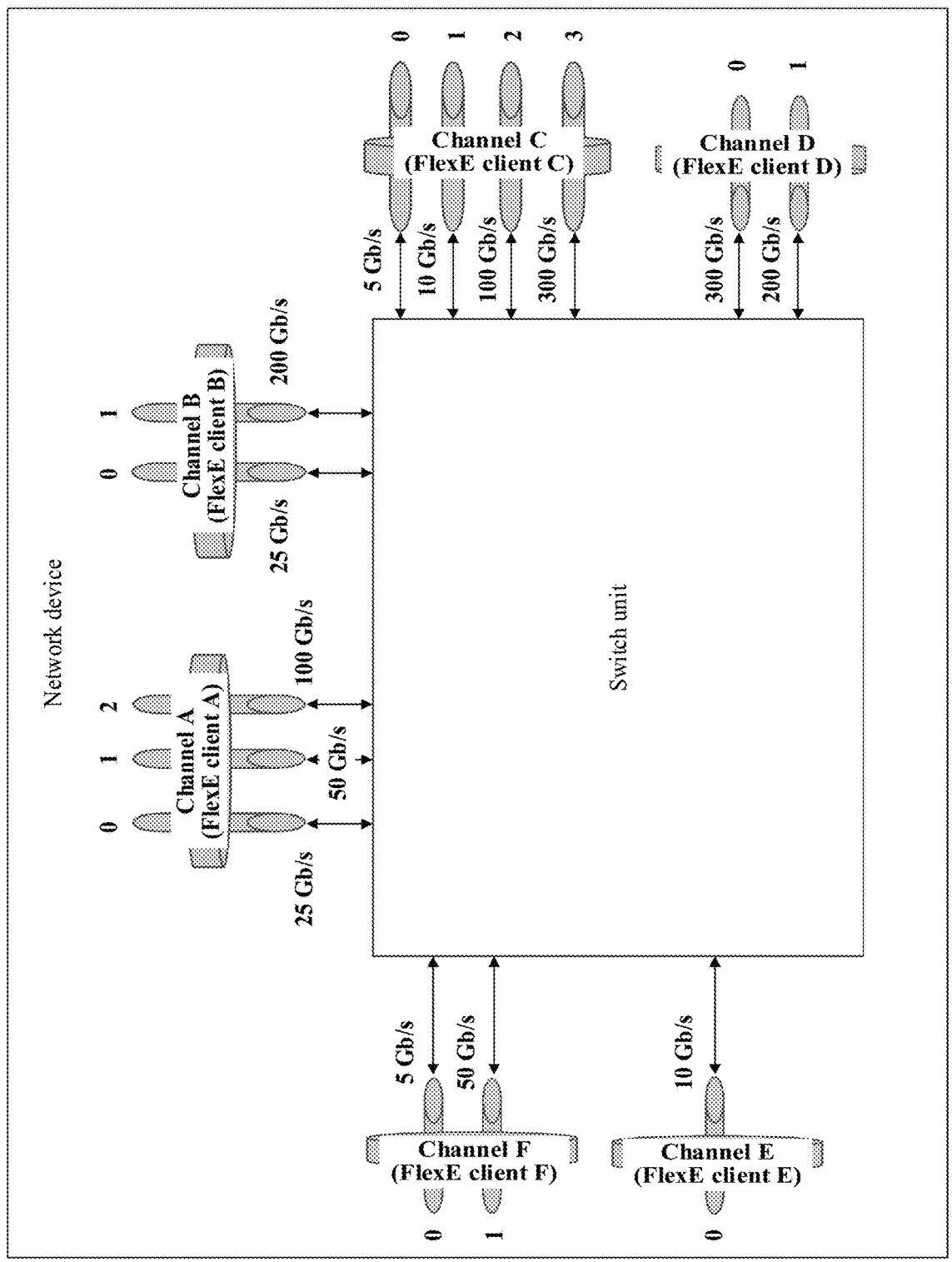
FIG. 4 is a schematic structural diagram of a network device according to an embodiment of this application.

For example, the network device (for example, the P device or the PE device) configured to perform the FlexE frame forwarding method shown in FIG. 3 may be shown in FIG. 4.

The network device shown in FIG. 4 includes six FlexE client channels a FlexE client A, a FlexE client B, a FlexE client C, a FlexE client D, a FlexE client E, and a FlexE client F respectively. The FlexE client A includes three logical subchannels with rates of 25 Gb/s, 50 Gb/s, and 100 Gb/s respectively, and subchannel identifiers corresponding to the three logical subchannels are 0, 1, and 2 respectively. The FlexE client B includes two logical subchannels with rates of 25 Gb/s and 200 Gb/s respectively, and subchannel identifiers corresponding to the two logical subchannels are 0 and 1 respectively. The FlexE client C includes four logical subchannels with rates of 5 Gb/s, 10 Gb/s, 100 Gb/s, and 300 Gb/s respectively, and subchannel identifiers corresponding to the four logical subchannels are 0, 1, 2, and 3 respectively. The FlexE client D includes two logical subchannels with rates of 300 Gb/s and 200 Gb/s respectively, and subchannel identifiers corresponding to the two logical subchannels are 0 and 1 respectively. The FlexE client E includes one logical subchannel with a rate of 10 Gb/s, and a subchannel identifier corresponding to the logical subchannel is 0. The FlexE client F includes two logical subchannels with rates of 5 Gb/s and 50 Gb/s respectively, and subchannel identifiers corresponding to the two logical subchannels are 0 and 1 respectively.

When a frame at a rate less than or equal to 5 Gb/s is to be forwarded, if the network device receives the frame through the FlexE client F, the network device may determine, by searching a forwarding table using a switch unit, that the frame can be forwarded through the FlexE client C, that is, forwarded through the logical subchannel 0 with the rate of 5 Gb/s in the FlexE client C. In reverse, if the network device receives the frame through the FlexE client C, the network device may determine, by searching the forwarding table using the switch unit, that the frame can be forwarded through the FlexE client F, that is, forwarded through the logical subchannel 0 with the rate of 5 Gb/s in the FlexE client F.

When a frame at a rate less than or equal to 10 Gb/s is to be forwarded, if the network device receives the frame through the FlexE client E, the network device may determine, by searching the forwarding table using the switch unit, that the frame can be forwarded through the FlexE client C, that is, forwarded through the logical subchannel 1 with the rate of 10 Gb/s in the FlexE client C. In reverse, if the network device receives the frame through the FlexE client C, the network device may determine, by searching the forwarding table using the switch unit, that the frame can be forwarded through the FlexE client E, that is, forwarded through the logical subchannel 0 with the rate of 10 Gb/s in the FlexE client E. Particularly, because the FlexE client E includes only one logical subchannel with the rate of 10 Gb/s, when the forwarding table is searched, a default subchannel identifier (which, for example, may be 0) may be used as an identifier of the logical subchannel.

In addition, the network device shown in FIG. 4 may be further configured to forward a frame at a rate less than or equal to 25 Gb/s, less than or equal to 50 Gb/s, less than or equal to 100 Gb/s, less than or equal to 200 Gb/s, or less than or equal to 300 Gb/s. Details are not described herein.

It should be noted that in FIG. 4, the subchannel identifiers may alternatively be numbered globally. To be specific, for the network device (for example, the P device or the PE device) that performs the method shown in FIG. 3, all the logical subchannels in the plurality of FlexE client channels included by the network device correspond to different subchannel identifiers. Still using the network device shown in FIG. 4 as an example, after the subchannel identifiers are numbered globally, subchannel identifiers corresponding to all the logical subchannel may be as follows. Subchannel identifiers corresponding to the three logical subchannels included in the FlexE client A are 0, 1, and 2 respectively. Subchannel identifiers corresponding to the two logical subchannels included in the FlexE client B are 3 and 4 respectively. Subchannel identifiers corresponding to the four logical subchannels included in the FlexE client C are 5, 6, 7, and 8 respectively. Subchannel identifiers corresponding to the two logical subchannels included in the FlexE client D are 9 and 10 respectively. A subchannel identifier corresponding to the logical subchannel included in the FlexE client E is 11. Subchannel identifiers corresponding to the two logical subchannels included in the FlexE client F are 12 and 13 respectively.

If the subchannel identifiers are numbered globally, the step of searching a preset forwarding table based on the first channel identifier and the first subchannel identifier to obtain a second channel identifier and a second subchannel identifier in S303 may be simplified as searching the preset forwarding table based on the first subchannel identifier to obtain the second channel identifier and the second subchannel identifier. In this case, the index entry of the forwarding table is the first subchannel identifier, and the result entry is the second channel identifier and the second subchannel identifier. In this way, a field of the forwarding table can be simplified, and system overheads can be reduced.

If the subchannel identifiers are numbered globally, the step of searching a preset forwarding table based on the first channel identifier and the first subchannel identifier to obtain a second channel identifier and a second subchannel identifier in S303 may alternatively be simplified as searching the preset forwarding table based on the first subchannel identifier to obtain the second subchannel identifier, and searching a table of a relationship between the subchannel identifier and the FlexE client output channel, to obtain the second channel identifier. In this case, the index entry of the forwarding table is the first subchannel identifier, and the result entry is the second subchannel identifier. In this way, a field of the forwarding table can be simplified, and system overheads can be reduced. S304. Forward the first frame based on the second channel identifier and the second subchannel identifier.

Further, a process of forwarding the first frame based on the second channel identifier and the second subchannel identifier in S304 may be implemented in the following manner adding the second subchannel identifier to the first frame, or replacing the first subchannel identifier carried in the first frame with the second subchannel identifier, and forwarding, through the FlexE client output channel indicated by the second channel identifier, the first frame that carries the second subchannel identifier.

Before the first frame is forwarded through the FlexE client output channel indicated by the second channel identifier, the second subchannel identifier may be added to the first frame, or the first subchannel identifier carried in the first frame is replaced with the second subchannel identifier such that the first frame carries the second subchannel identifier used to indicate the logical subchannel that is in the FlexE client output channel and that is configured to forward the first frame.

It should be understood that the FlexE frame forwarding method provided in this embodiment of this application may be applied to unicast forwarding, and may also be applied to multicast forwarding. The foregoing description of the FlexE frame forwarding method provided in this embodiment of this application is mainly for unicast forwarding. When this embodiment of this application is applied to multicast forwarding, the searching a preset forwarding table based on the first channel identifier and the first subchannel identifier to obtain a second channel identifier and a second subchannel identifier in S303 may be specifically implemented in the following manner searching the preset forwarding table based on the first channel identifier and the first subchannel identifier to obtain a MID corresponding to the first channel identifier and the first subchannel identifier, and searching a preset multicast table based on the MID to obtain a plurality of second channel identifiers corresponding to the MID and a plurality of second subchannel identifiers that one-to-one correspond to the plurality of second channel identifiers, and the forwarding the first frame based on the second channel identifier and the second subchannel identifier in S304 may be specifically implemented in the following manner replicating the first frame to obtain first frames whose quantity is the same as that of the plurality of second channel identifiers, and respectively forwarding, based on the plurality of second channel identifiers and the plurality of second subchannel identifiers that one-to-one correspond to the plurality of second channel identifiers, the first frames whose quantity is the same as that of the plurality of second channel identifiers.

In other words, when this embodiment of this application is applied to multicast forwarding, one MID may be obtained by searching the preset forwarding table, and then a plurality of second channel identifiers corresponding to the MID and a plurality of second subchannel identifiers that one-to-one correspond to the plurality of second channel identifiers may be obtained by searching a multicast table based on the MID. Each group {the second channel identifier, the second subchannel identifier} may correspond to one logical subchannel. Accordingly, it may be understood that, after being replicated, the first frame may be forwarded through the logical subchannel corresponding to each group {the second channel identifier, the second subchannel identifier}.

It should be noted that the FlexE frame forwarding method shown in FIG. 3 may be applied to the P device or the PE device in the transport network shown in FIG. 1.

When the method shown in FIG. 3 is applied to the P device, both the FlexE client input channel and the FlexE client output channel use an NNI interface. In this case, the FlexE client input channel and the FlexE client output channel each may be considered as a FlexE port.

When the method shown in FIG. 3 is applied to the PE device, if the first frame received from the CE device is forwarded to the PE device by performing the method shown in FIG. 3, the FlexE client input channel uses a UNI interface, and the FlexE client output channel uses an NNI interface. In this case, the FlexE client input channel may be considered as a standard Ethernet port, and the FlexE client output channel may be considered as a FlexE port. If the first frame received from the PE device is forwarded to the CE device by performing the method shown in FIG. 3, the FlexE client input channel uses an NNI interface, and the FlexE client output channel uses a UNI interface. In this case, the FlexE client input channel may be considered as a FlexE port, and the FlexE client output channel may be considered as a standard Ethernet port.

In this embodiment of this application, the first frame may be a data frame, or may be an OAM frame. As described above, because the first frame carries the first subchannel identifier, compared with a frame forwarded in other approaches, the first frame in this embodiment of this application needs to have a frame format to be modified. The following separately describes a format of the first frame when the first frame is a data frame and a format of the first frame when the first frame is an OAM frame.

1. The first frame is a data frame.

If the first frame is a data frame, the first frame may carry the first subchannel identifier in two manners.

First Manner.

Figure 5:
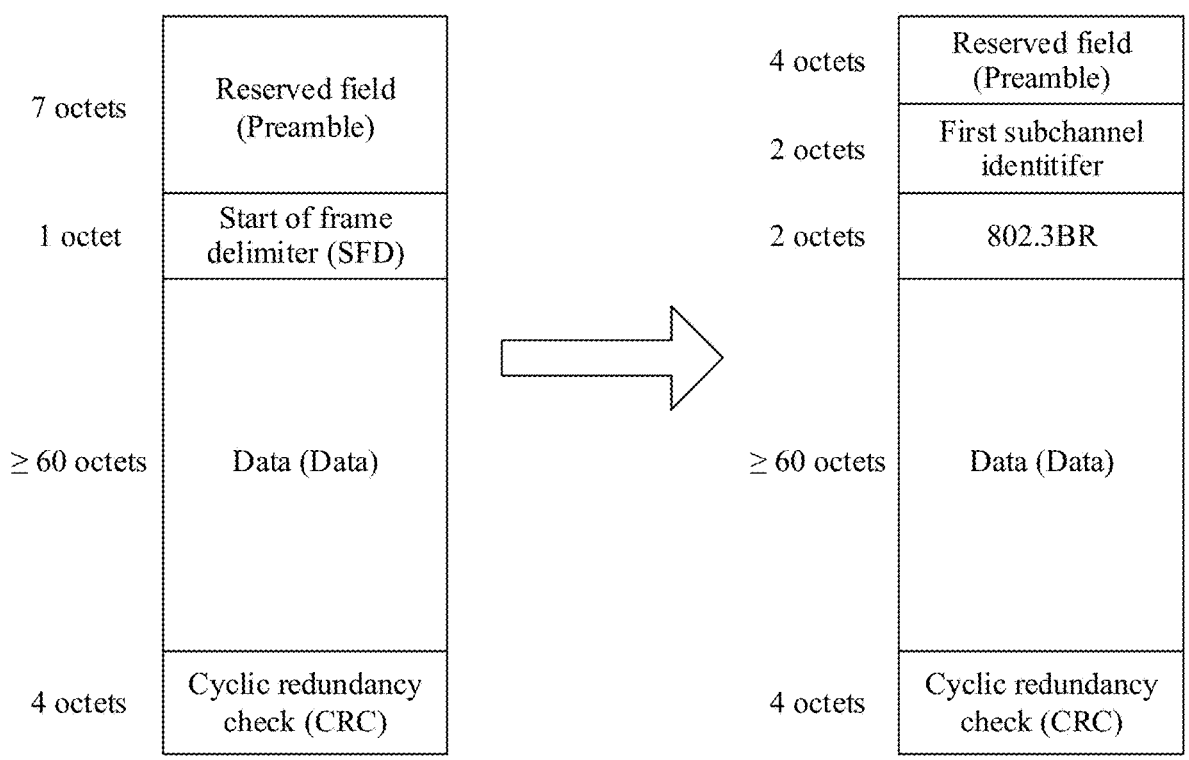
FIG. 5 is a schematic diagram of a frame structure of a data frame according to an embodiment of this application.

Some bytes in a reserved field (Preamble) of the data frame are allocated to the first subchannel identifier. This manner may be shown in FIG. 5. In FIG. 5, a format of a left-side frame is a frame format of an Ethernet frame in other approaches, and a format of a right-side frame is a frame format of the first frame in this embodiment of this application.

For example, if a first data frame meets a definition of 802.3-2015 7.2.3 Frame structure and 82.2 Physical Coding Sublayer (PCS) in the IEEE 802.3-2015 standard, the first data frame includes an S block part, a D block part, and a T block part. The S block part may carry the first subchannel identifier.

For example, if a second data frame meets a definition of 3.2 Elements of MAC frame and frame in the Institute for Electrical and Electronics Engineers (IEEE) 802.3-2015 standard, the second data frame includes DMAC, SMAC, a VLAN tag, and a data field (data). The VLAN tag part may carry the first subchannel identifier.

In the first manner in which a reserved field is allocated to the first subchannel identifier, no bandwidth increase is caused in a frame forwarding process. In addition, this frame format of the first frame is also compatible with a modification of 802.3BR.

Second Manner.

Several bytes are added to the first frame, and the added bytes may carry the first subchannel identifier.

In the second manner, a reserved field (Preamble) in the first frame does not need to be occupied, but a bandwidth change is caused.

2. The first frame is an OAM frame.

For example, a frame format of the OAM frame may be shown in FIG. 6. The OAM frame shown in FIG. 6 may be applied to a frame switching process between FlexE client channels. In addition, in the OAM frame shown in FIG. 6, 0x6 may be alternatively replaced with any code block that is different from 0x5 and that has a same byte.

When the first frame is an OAM frame, the first frame may carry the first subchannel identifier in the following manner. Several bytes in a data field of the OAM frame are used to carry the first subchannel identifier. For example, the OAM frame includes at least one 64b/66b code block, and the at least one 64b/66b code block carries the first subchannel identifier.

It should be noted that the foregoing several implementations in which the first frame carries the first subchannel identifier are merely examples. A manner in which the first frame carries the first subchannel identifier is not specifically limited in this embodiment of this application.

According to the FlexE frame forwarding method provided in this embodiment of this application, because the first frame carries the first subchannel identifier used to indicate the logical subchannel of the FlexE client input channel, after the first frame is received, the first subchannel identifier used to indicate the FlexE client input channel and the first subchannel identifier carried in the first frame may be obtained. Then the forwarding table may be searched to determine the second channel identifier and the second subchannel identifier that are used to forward the first frame, and the first frame is forwarded based on the second channel identifier and the second subchannel identifier.

According to the FlexE frame forwarding method, because the first frame may be considered to be received through a logical subchannel of the FlexE client input channel, when being forwarded, the first frame may also be considered to be forwarded through a logical subchannel of the FlexE client output channel. Accordingly, a FlexE client channel with a fixed transmission rate may be divided into a plurality of logical subchannels. In this way, in a process of forwarding the first frame, when being selected, the FlexE client input channel and the FlexE client output channel are not necessarily limited to an inherent transmission rate of the FlexE client channel. Compared with a manner in other approaches that can implement only one-to-one forwarding between two FlexE clients with a same rate, the foregoing solution can achieve a more flexible frame forwarding process.

Using the network device (for example, may be the P device or the PE device) shown in FIG. 4 as an example, the FlexE frame forwarding method provided in this embodiment of this application may be used to overcome five problems in the frame forwarding solution provided in other approaches.

1. The solution in other approaches can implement only one-to-one forwarding between two FlexE clients. However, the FlexE frame forwarding method provided in this embodiment of this application can implement one-to-many forwarding or many-to-one forwarding between FlexE client channels. For example, in FIG. 4, frames may be respectively switched between one of the logical subchannel 0 with the rate of 5 Gb/s and the logical subchannel 1 with the rate of 50 Gb/s in the FlexE client F and one of the logical subchannel 0 with the rate of 5 Gb/s in the FlexE client C and the logical subchannel 1 with the rate of 50 Gb/s in the FlexE client A, to implement one-to-many forwarding. For another example, in FIG. 4, frames may be switched from all the logical subchannel 1 with the rate of 50 Gb/s in the FlexE client F, the logical subchannel 0 with the rate of 25 Gb/s in the FlexE client B, and the logical subchannel 2 with the rate of 100 Gb/s in the FlexE client C to the FlexE client A, to implement many-to-one forwarding.

2. In the solution in other approaches, rates of two FlexE client channels between which a frame is switched need to be the same. However, in the FlexE frame forwarding method provided in this embodiment of this application, it is not limited that rates of two FlexE client channels between which a frame is switched are the same. For example, in FIG. 4, the FlexE client E may switch a frame with the logical subchannel 1 with the rate of 10 Gb/s in the FlexE client C through the logical subchannel 0 with the rate of 10 Gb/s. The rate of the FlexE client E is 10 Gb/s, while a rate of the FlexE client C is 415 Gb/s (5 Gb/s+10 Gb/s+100 Gb/s+300 Gb/s=415 Gb/s), and therefore, rates of the FlexE client E and the FlexE client C are different.

3. Data streams of a plurality of low-speed FlexE client channels cannot be switched to one high-speed FlexE client channel using the solution in other approaches. However, data streams of a plurality of low-speed FlexE client channels can be switched to one high-speed FlexE client channel using the FlexE frame forwarding method provided in this embodiment of this application. For example, in FIG. 4, the rate of the FlexE client E is 10 Gb/s, a rate of the FlexE client F is 55 Gb/s (5 Gb/s+50 Gb/s=55 Gb/s), and the rate of the FlexE client C is 415 Gb/s. Both a frame received through the logical subchannel 0 with the rate of 10 Gb/s in the FlexE client E and a frame received through the logical subchannel 0 with the rate of 5 Gb/s in the FlexE client F may be forwarded through the FlexE client C. The FlexE client E and the FlexE client F may be considered as low-speed FlexE client channels, and the FlexE client C may be considered as a high-speed FlexE client channel. Therefore, according to the FlexE frame forwarding method provided in this embodiment of this application, data streams of two low-speed FlexE client channels can be switched to one high-speed FlexE client channel.

4. In the solution in other approaches, a data stream of a high-speed FlexE client channel cannot be split to be switched to a plurality of low-speed FlexE client channels. However, according to the FlexE frame forwarding method provided in this embodiment of this application, a data stream of a high-speed FlexE client channel can be split to be switched to a plurality of low-speed FlexE client channels. For example, in FIG. 4, a frame received through the logical subchannel 0 with the rate of 5 Gb/s in the FlexE client C and a frame received through the logical subchannel 1 with the rate of 10 Gb/s in the FlexE client C may be respectively forwarded through the logical subchannel 0 with the rate of 5 Gb/s in the FlexE client F and the logical subchannel 0 with the rate of 10 Gb/s in the FlexE client E. Herein, the FlexE client C may be considered as a high-speed FlexE client channel, and the FlexE client F and the FlexE client E may be considered as low-speed FlexE client channels. Therefore, according to the FlexE frame forwarding method provided in this embodiment of this application, a data stream of a high-speed FlexE client channel can be split to be switched to a plurality of low-speed FlexE client channels.

5. In the solution in other approaches, because a granularity of a rate of a FlexE client channel is 5 Gb/s, resources are wasted when a low-speed data stream is transmitted. According to the FlexE frame forwarding method provided in this embodiment of this application, after a FlexE client channel is divided into a plurality of logical subchannels, rates of the logical subchannels are not limited by the granularity of 5 Gb/s. Therefore, resource waste can be reduced when a low-speed data stream is transmitted. For example, for two FlexE client channels with a rate of 5 Gb/s, the two FlexE client channels each may be divided into five logical subchannels with a rate of 1 Gb/s. When frames are switched between the two FlexE client channels, five frames at a rate of 1 Gb/s can be switched through the logical subchannels. This reduces resource waste when a frame at a rate of 1 Gb/s is switched through 5 Gb/s FlexE client channels in other approaches.

In addition, according to the FlexE frame forwarding method provided in this embodiment of this application, because a FlexE client channel is divided into a plurality of logical subchannels, one FlexE client channel may be configured to forward a plurality of frames. Therefore, when a frame is forwarded to the P device at the core layer using the PE device, compared with other approaches, the FlexE frame forwarding method greatly reduces a quantity of FlexE clients carried by the P device at the core layer, thereby reducing processing load of the P device in the transport network.

Figure 7:
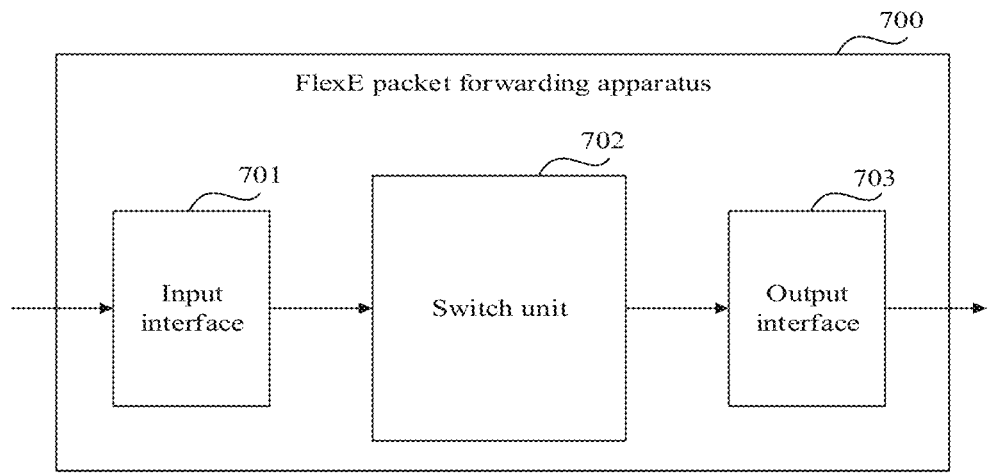
FIG. 7 is a schematic structural diagram of a FlexE frame forwarding apparatus according to an embodiment of this application.

Based on the foregoing embodiment, an embodiment of this application further provides a FlexE frame forwarding apparatus. The apparatus may be configured to perform the FlexE frame forwarding method shown in FIG. 3. Referring to FIG. 7, the FlexE frame forwarding apparatus 700 includes an input interface 701, a switch unit 702, and an output interface 703.

The input interface 701 is configured to receive a first frame through a FlexE client input channel.

The switch unit 702 is configured to obtain a first channel identifier used to indicate the FlexE client input channel and a first subchannel identifier carried in the first frame, where the first subchannel identifier is used to indicate a logical subchannel of the FlexE client input channel, and search a preset forwarding table based on the first channel identifier and the first subchannel identifier to obtain a second channel identifier and a second subchannel identifier, where the second channel identifier is used to indicate a FlexE client output channel, and the second subchannel identifier is used to indicate a logical subchannel of the FlexE client output channel.

The output interface 703 is configured to forward the first frame based on the second channel identifier and the second subchannel identifier.

Optionally, the FlexE client input channel is divided into N logical subchannels, and N≥1.

Optionally, when forwarding the first frame based on the second channel identifier and the second subchannel identifier, the output interface 703 is further configured to add the second subchannel identifier to the first frame, or replace the first subchannel identifier carried in the first frame with the second subchannel identifier, and forward, through the FlexE client output channel indicated by the second channel identifier, the first frame that carries the second subchannel identifier.

Optionally, when obtaining the first subchannel identifier carried in the first frame, the switch unit 702 is further configured to, if the first frame carries the first subchannel identifier, obtain the first subchannel identifier carried in the first frame, or if the first frame does not carry the first subchannel identifier, add a preset default subchannel identifier to the first frame, and use the default subchannel identifier as the first subchannel identifier carried in the first frame.

Optionally, when searching the preset forwarding table based on the first channel identifier and the first subchannel identifier to obtain the second channel identifier and the second subchannel identifier, the switch unit 702 is further configured to search the preset forwarding table based on the first channel identifier and the first subchannel identifier to obtain a MID corresponding to the first channel identifier and the first subchannel identifier, and search a preset multicast table based on the MID to obtain a plurality of second channel identifiers corresponding to the MID and a plurality of second subchannel identifiers that one-to-one correspond to the plurality of second channel identifiers. When forwarding the first frame based on the second channel identifier and the second subchannel identifier, the output interface 703 is further configured to replicate the first frame to obtain first frames whose quantity is the same as that of the plurality of second channel identifiers, and respectively forward, based on the plurality of second channel identifiers and the plurality of second subchannel identifiers that one-to-one correspond to the plurality of second channel identifiers, the first frames whose quantity is the same as that of the plurality of second channel identifiers.

Optionally, when searching the preset forwarding table based on the first channel identifier and the first subchannel identifier to obtain the second channel identifier and the second subchannel identifier, the switch unit 702 is further configured to generate a first tag index based on the first channel identifier and the first subchannel identifier, search the forwarding table based on the first tag index to obtain a second tag index corresponding to the first tag index, and generate the second channel identifier and the second subchannel identifier based on the second tag index.

Optionally, the first frame is a first data frame, the first data frame includes an S block part, a D block part, and a T block part, and the S block part carries the first subchannel identifier.

Optionally, the first frame is a second data frame, the second data frame includes DMAC, SMAC, a VLAN tag, and data, and the VLAN tag carries the first subchannel identifier.

Optionally, the first frame is an OAM frame, the OAM frame includes at least one 64b/66b code block, and the at least one 64b/66b code block carries the first subchannel identifier.

Optionally, the FlexE client input channel is a standard Ethernet port, or the FlexE client output channel is a standard Ethernet port.

It should be noted that the FlexE frame forwarding apparatus 700 shown in FIG. 7 may be configured to perform the FlexE frame forwarding method shown in FIG. 3. For an implementation that is not described in detail in the embodiment of the FlexE frame forwarding apparatus 700, refer to related descriptions in the FlexE frame forwarding method shown in FIG. 3.

Figure 8:
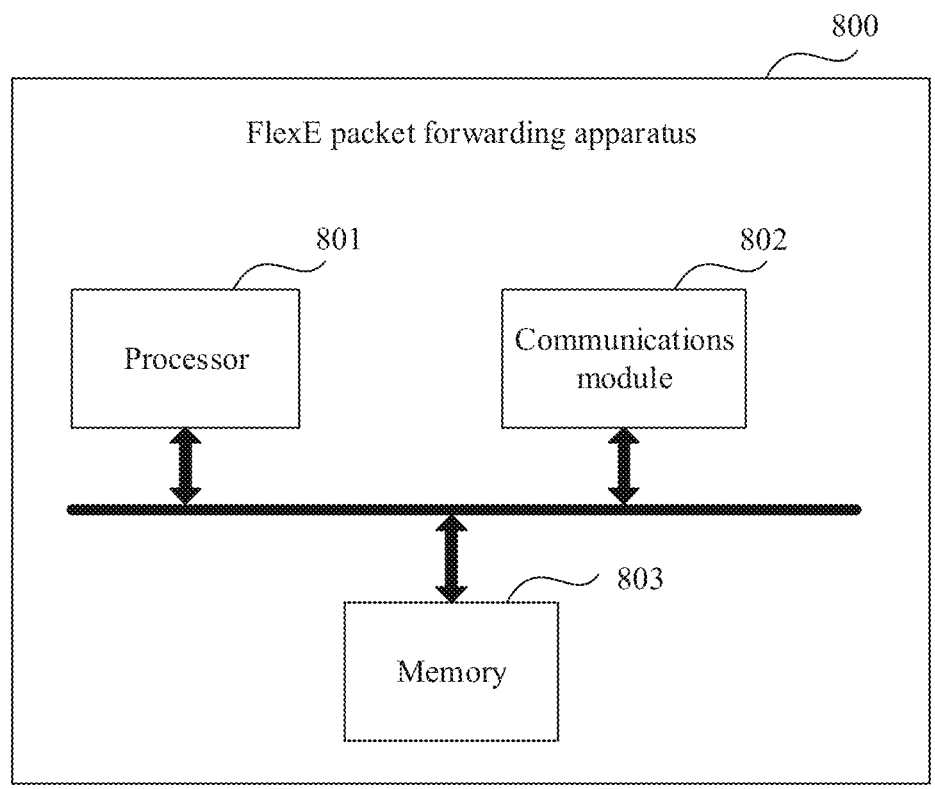
FIG. 8 is a schematic structural diagram of another FlexE frame forwarding apparatus according to an embodiment of this application.

An embodiment of this application further provides a FlexE frame forwarding apparatus. The FlexE frame forwarding apparatus uses the method provided in the embodiment corresponding to FIG. 3, and may be an apparatus that is the same as the FlexE frame forwarding apparatus shown in FIG. 7. Referring to FIG. 8, the FlexE frame forwarding apparatus 800 includes a processor 801, a communications module 802, and a memory 803.

The processor 801 is configured to read a program in the memory 803, to perform the following process receiving a first frame using the communications module 802, obtaining a first channel identifier used to indicate the FlexE client input channel and a first subchannel identifier carried in the first frame, searching a preset forwarding table based on the first channel identifier and the first subchannel identifier to obtain a second channel identifier and a second subchannel identifier, and forwarding the first frame using the communications module 802 and based on the second channel identifier and the second subchannel identifier.

Optionally, when forwarding the first frame using the communications module 802, the processor 801 is further configured to add the second subchannel identifier to the first frame, or replace the first subchannel identifier carried in the first frame with the second subchannel identifier, and forward, through the FlexE client output channel indicated by the second channel identifier, the first frame that carries the second subchannel identifier.

Optionally, when obtaining the first subchannel identifier carried in the first frame, the processor 801 is further configured to, if the first frame carries the first subchannel identifier, obtain the first subchannel identifier carried in the first frame, or if the first frame does not carry the first subchannel identifier, add a preset default subchannel identifier to the first frame, and use the default subchannel identifier as the first subchannel identifier carried in the first frame.

Optionally, when searching the preset forwarding table based on the first channel identifier and the first subchannel identifier to obtain the second channel identifier and the second subchannel identifier, the processor 801 is further configured to search the preset forwarding table based on the first channel identifier and the first subchannel identifier to obtain a MID corresponding to the first channel identifier and the first subchannel identifier, and search a preset multicast table based on the MID to obtain a plurality of second channel identifiers corresponding to the MID and a plurality of second subchannel identifiers that one-to-one correspond to the plurality of second channel identifiers.

When forwarding the first frame using the communications module 802, the processor 801 is further configured to replicate the first frame to obtain first frames whose quantity is the same as that of the plurality of second channel identifiers, and respectively forward, based on the plurality of second channel identifiers and the plurality of second subchannel identifiers that one-to-one correspond to the plurality of second channel identifiers, the first frames whose quantity is the same as that of the plurality of second channel identifiers.

Optionally, when searching the preset forwarding table based on the first channel identifier and the first subchannel identifier to obtain the second channel identifier and the second subchannel identifier, the processor 801 is further configured to generate a first tag index based on the first channel identifier and the first subchannel identifier, search the forwarding table based on the first tag index to obtain a second tag index corresponding to the first tag index, and generate the second channel identifier and the second subchannel identifier based on the second tag index.

In a possible implementation, the FlexE frame forwarding apparatus is a P device or a PE device.

The processor 801, the communications module 802, and the memory 803 may be implemented using a bus as a general bus architecture. According to a specific application and an overall design constraint of the FlexE frame forwarding apparatus, the bus may include any quantity of interconnection buses and bridges, and specifically, various circuits of one or more processors represented by the processor 801 and a memory represented by the memory 803 are connected together. The bus architecture may further connect various other circuits such as a peripheral device, a voltage stabilizer, and a power management circuit. These are well known in the art, and therefore are not further described in this specification. A bus interface provides an interface. The communications module 802 may be a plurality of elements, that is, include a transmitter and a receiver, or include a communications interface. The communications interface has receiving and sending functions, and provides a unit configured to communicate with various other apparatuses on a transmission medium. The processor 801 is responsible for managing a bus architecture and normal processing. The memory 803 may store data used when the processor 801 performs an operation.

Optionally, the processor 801 may be a central processing unit, an application-specific integrated circuit (ASIC), a field-programmable gate array (FPGA), or a complex programmable logic device (CPLD). In conclusion, the embodiments of this application provide the FlexE frame forwarding method and apparatus. A FlexE frame forwarding process can be more flexible using the solutions provided in the embodiments of this application.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct a computer or any other programmable data processing device to work in a specific manner such that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or any other programmable data processing device such that a series of operations and steps are performed on the computer or the any other programmable device, thereby generating computer-implemented processing. Therefore, the instructions executed on the computer or the any other programmable device provides steps for implementing a specific function in one or more processes in the flowcharts and/or in one or more blocks in the block diagrams.

It is clear that a person skilled in the art can make various modifications and variations to this application without departing from the spirit and scope of this application. This application is intended to cover these modifications and variations of this application provided that they fall within the scope of protection defined by the following claims of this application and their equivalent technologies.

All or some of the foregoing embodiments may be implemented using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedures or functions according to the embodiments of the present disclosure are generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

What is claimed is:

1. A flexible Ethernet (FlexE) frame forwarding method, comprising:
receiving a first frame through a FlexE client input channel, wherein the first frame comprises a first channel identifier and a first subchannel identifier, wherein the first channel identifier indicates the FlexE client input channel, and wherein the first subchannel identifier indicates a logical subchannel of the FlexE client input channel;
obtaining a first channel identifier and the first subchannel identifier from the first frame;
searching a preset forwarding table for a second channel identifier corresponding to the first channel identifier and a second subchannel identifier corresponding to the first subchannel identifier, wherein the second channel identifier indicates a FlexE client output channel, and wherein the second subchannel identifier indicates a logical subchannel of the FlexE client output channel; and
forwarding the first frame based on the second channel identifier and the second subchannel identifier, wherein a transmission rate of the FlexE client input channel matches a transmission rate of the FlexE client output channel.

2. The FlexE frame forwarding method of claim 1, further comprising dividing the FlexE client input channel into a plurality of logical subchannels.

3. The FlexE frame forwarding method of claim 1, further comprising:
adding the second subchannel identifier to the first frame or replacing the first subchannel identifier with the second subchannel identifier in the first frame; and
forwarding, after the adding or replacing the first frame through the FlexE client output channel.

4. The FlexE frame forwarding method of claim 1, further comprising:
obtaining the first subchannel identifier carried in the first frame when the first frame carries the first subchannel identifier; and
adding a preset default subchannel identifier to the first frame and using the default subchannel identifier as the first subchannel identifier carried in the first frame when the first frame does not carry the first subchannel identifier.

5. The FlexE frame forwarding method of claim 1, further comprising:
searching the preset forwarding table to obtain a multicast identification (MID) of the first channel identifier and the first subchannel identifier;
searching a preset multicast table to obtain a plurality of second channel identifiers corresponding to the MID and a plurality of second subchannel identifiers that correspond one-to-one to the plurality of second channel identifiers;
replicating the first frame to obtain a plurality of replicated frames, wherein a quantity of the plurality of replicated frames is the same as a quantity of the plurality of second channel identifiers; and
forwarding the plurality of replicated frames based on the plurality of second channel identifiers and the plurality of second subchannel identifiers.

6. The FlexE frame forwarding method of claim 1, further comprising:
generating a first tag index based on the first channel identifier and the first subchannel identifier;
searching the forwarding table to obtain a second tag index corresponding to the first tag index; and
generating the second channel identifier and the second subchannel identifier based on the second tag index.

7. The FlexE frame forwarding method of claim 1, wherein the first frame is a first data frame, wherein the first data frame includes an S block part, a D block part, and a T block part, and wherein the S block part or the D block part carries the first subchannel identifier.

8. The FlexE frame forwarding method of claim 1, wherein the first frame is a second data frame, wherein the second data frame includes a destination media access control (DMAC) address, a source media access control (SMAC) address, a virtual local area network (VLAN) tag, and a data field, and wherein the VLAN tag carries the first subchannel identifier.

9. The FlexE frame forwarding method of claim 1, wherein the first frame is an operation, administration, and maintenance (OAM) frame, wherein the OAM frame consists of a 64b/66b code block, and wherein the 64b/66b code block carries the first subchannel identifier.

10. The FlexE frame forwarding method of claim 1, wherein the FlexE client input channel is a standard Ethernet port, or the FlexE client output channel is the standard Ethernet port.

11. A flexible Ethernet (FlexE) frame forwarding apparatus, comprising:
an input interface configured to receive a first frame through a FlexE client input channel, wherein the first frame comprises a first channel identifier and a first subchannel identifier, wherein the first channel identifier indicates the FlexE client input channel, and wherein the first subchannel identifier indicates a logical subchannel of the FlexE client input channel;
a switch coupled to the input interface and configured to:
obtain a first channel identifier and the first subchannel identifier from the first frame; and
search a preset forwarding table for a second channel identifier corresponding to the first channel identifier and a second subchannel identifier corresponding to the first subchannel identifier, wherein the second channel identifier indicates a FlexE client output channel, and wherein the second subchannel identifier indicates a logical subchannel of the FlexE client output channel; and
an output interface coupled to the switch and configured to forward the first frame based on the second channel identifier and the second subchannel identifier, wherein a transmission rate of the FlexE client input channel matches a transmission rate of the FlexE client output channel.

12. The FlexE frame forwarding apparatus of claim 11, wherein the input interlace is further configured to divide the FlexE client input channel into N logical subchannels.

13. The FlexE frame forwarding apparatus of claim 11, wherein when forwarding the first frame, the output interface is further configured to:
add the second subchannel identifier to the first frame, or replace the first subchannel identifier with the second subchannel identifier in the first frame; and
forward, after the output interface adds or replaces, the first frame through the FlexE client output channel.

14. The FlexE frame forwarding apparatus of claim 11, wherein when obtaining the first subchannel identifier, the switch is further configured to:
obtain the first subchannel identifier carried in the first frame when the first frame carries the first subchannel identifier; or
add a preset default subchannel identifier to the first frame and use the default subchannel identifier as the first subchannel identifier carried in the first frame when the first frame does not carry the first subchannel identifier.

15. The FlexE frame forwarding apparatus of claim 11, wherein when searching the preset forwarding table, the switch is further configured to:
search the preset forwarding table to obtain a multicast identification (MID) of the first channel identifier and the first subchannel identifier; and
search a preset multicast table to obtain a plurality of second channel identifiers corresponding to the MID and a plurality of second subchannel identifiers that correspond one-to-one to the plurality of second channel identifiers,
wherein when forwarding the first frame, the output interface is further configured to:
replicate the first frame to obtain a plurality of first frames, wherein a quantity of the plurality of replicated frames is the same as a quantity of the plurality of second channel identifiers; and
forward the plurality of replicated frames based on the plurality of second channel identifiers and the plurality of second subchannel identifiers.

16. The FlexE frame forwarding apparatus of claim 11, wherein when searching the preset forwarding table, the switch is further configured to:
generate a first tag index based on the first channel identifier and the first subchannel identifier;
search the forwarding table to obtain a second tag index corresponding to the first tag index; and
generate the second channel identifier and the second subchannel identifier based on the second tag index.

17. The FlexE frame forwarding apparatus of claim 11, wherein the first frame is a first data frame, wherein the first data frame comprises an S block part, a D block part, and a T block part, and wherein the S block part or the D block part carries the first subchannel identifier.

18. The FlexE frame forwarding apparatus of claim 11, wherein the first frame is a second data frame, wherein the second data frame comprises a destination media access control (DMAC) address, a source media access control (SMAC) address, a virtual local area network (VLAN) tag, and data, and wherein the VLAN tag carries the first subchannel identifier.

19. The FlexE frame forwarding apparatus of claim 11, wherein the first frame is an operation, administration, and maintenance (OAM) frame, wherein the OAM frame consists of a 64b/66b code block, and wherein the 64b/66b code block carries the first subchannel identifier.

20. The FlexE frame forwarding apparatus of claim 11, wherein the FlexE client input channel is a standard Ethernet port, or the FlexE client output channel is the standard Ethernet port.

* * * * *